US006944342B1

(12) United States Patent
Stahl et al.

(10) Patent No.: US 6,944,342 B1
(45) Date of Patent: Sep. 13, 2005

(54) METHOD FOR RECOGNIZING OBJECTS IN AN IMAGE PIXEL PLANE

(75) Inventors: Christoph Stahl, Ottobrunn (DE); Thomas Fechner, Berlin (DE); Oliver Rockinger, Friedrichshafen (DE)

(73) Assignee: EADS Deutschland GmbH, Munich (DE)

( * ) Notice: Subject to any disclaimer, the term of this patent is extended or adjusted under 35 U.S.C. 154(b) by 490 days.

(21) Appl. No.: 09/721,457

(22) Filed: Nov. 20, 2000

(30) Foreign Application Priority Data

Nov. 20, 1999 (DE) ............................... 199 55 919

(51) Int. Cl.[7] ........................... G06K 9/62; G06K 9/36
(52) U.S. Cl. ..................... 382/224; 382/280; 382/156
(58) Field of Search ................................ 382/224–227, 382/294, 156, 103, 190, 195, 260–264, 280

(56) References Cited

U.S. PATENT DOCUMENTS

| | | | | |
|---|---|---|---|---|
| 4,881,270 | A | * | 11/1989 | Knecht et al. ............... 382/191 |
| 5,247,584 | A | * | 9/1993 | Krogmann .................. 382/107 |
| 5,465,308 | A | * | 11/1995 | Hutcheson et al. ......... 382/159 |
| 5,640,468 | A | * | 6/1997 | Hsu ........................... 382/190 |
| 5,835,901 | A | * | 11/1998 | Duvoisin et al. ............ 706/19 |
| 5,838,816 | A | * | 11/1998 | Holmberg ................... 382/157 |
| 5,911,002 | A | | 6/1999 | Mitsuyama et al. |
| 5,937,078 | A | * | 8/1999 | Hyland et al. .............. 382/103 |
| 5,956,427 | A | * | 9/1999 | Greenspan et al. ......... 382/240 |
| 5,963,653 | A | | 10/1999 | McNary et al. |
| 6,038,337 | A | * | 3/2000 | Lawrence et al. .......... 382/156 |
| 6,042,050 | A | * | 3/2000 | Sims et al. .................. 244/3.17 |
| 6,243,492 | B1 | * | 6/2001 | Kamei ........................ 382/181 |
| 6,263,103 | B1 | * | 7/2001 | Freeman et al. ............ 382/103 |
| 6,393,137 | B1 | * | 5/2002 | Chen et al. ................. 382/103 |
| 6,529,614 | B1 | * | 3/2003 | Chao et al. ................. 382/103 |
| 6,556,708 | B1 | * | 4/2003 | Christian et al. ........... 382/165 |
| 6,597,800 | B1 | * | 7/2003 | Murray et al. .............. 382/103 |

FOREIGN PATENT DOCUMENTS

| | | |
|---|---|---|
| DE | 4438235 | 5/1996 |
| DE | 19639884 | 9/2000 |

OTHER PUBLICATIONS

Practice of Digital Image Processing and Pattern Recognition by P. Haberaecker, published by Carl Hanser Verlag, 1995 ("Praxis der Digitalen Bildverarbeitung und Mustererkennung"); pp. 125 to 168.

(Continued)

*Primary Examiner*—Mehrdad Dastouri
(74) *Attorney, Agent, or Firm*—Greenblum & Bernstein, P.L.C.

(57) ABSTRACT

Image data of optically acquired input images (1) are processed for emphasizing at least two object classes. Each pixel is subjected to a rough classification (10) based on first criteria that determine whether or not a pixel is relevant for an object recognition. A reduced image (11) is formed from the relevant pixels and irrelevant pixels are omitted. The reduced image (11) is filtered (20) for forming at least two correlated filtered images (21, 22, 23) based on second criteria. Classified images (31A, 32A, 33A) are formed from the filtered images by classifiers that work in accordance with predetermined rules. Weighting factors are allocated to each object class. The classified images are merged in accordance with an algorithm to make a combined global evaluation for each object class. The global evaluation decides, based on the merged images (41A, 41B, 41C), for each pixel whether the respective pixel belongs to an object class and if so to which object class.

9 Claims, 4 Drawing Sheets

OTHER PUBLICATIONS

"Automatic Target Detection and Recognition", T. Dodd, University of Southhampton, Technical Report ISIS TR-4, pp. 1-19.

"Classifier and Shift-invariant Automatic Target Recognition Neural Networks", David P. Casenant and Leonard m. Neiberg, Pergamon, 1995 Special Issue, pp. 1117-1128.

"Machine Learning Research", Thomas G. Dietterich, AI Magazine, Winter 1997, pp. 97-133.

"Vehicle Detection in Infrared Linescan Imagery using Belief Networks", P.G. Ducksbury, D.M. Booth, C.J. Radford, 5th Int. Conf. Image Proc. and Applications, Heriot-Watt University, Edinburgh, Jul. 3-5, 1995, 5 pages.

"Automatic Target Recognition Using a Feature-Decomposition and Data-Decomposition Modular Neural Network" by L. Wang et al. IEEE Transactions on Image Processing, IEEE, New York, USA, vol. 7, No. 8, Aug. 1998; pp. 1113 to 1121, XP000768985.

"A Tutorial on Multisensor Integration and Fusion" by R. Luo et al., Signal Processing and System Control, Factory Automation, Pacific Grove, Proceedings of the Annual Conference of the Industrial Electronics Society, (IECON), New York, USA, Nov. 27-30, 1990, pp. 707-722, IEEE vol. 1, Conf. 16, XO010038257.

"Detection Filters and Algorithm Fusion for ATR", by David Casasent et al., IEEE Transactions on Image Processing, IEEE New York, USA, vol. 6, No. 1, Jan. 1997, pp. 114-125, XP 000642456.

* cited by examiner

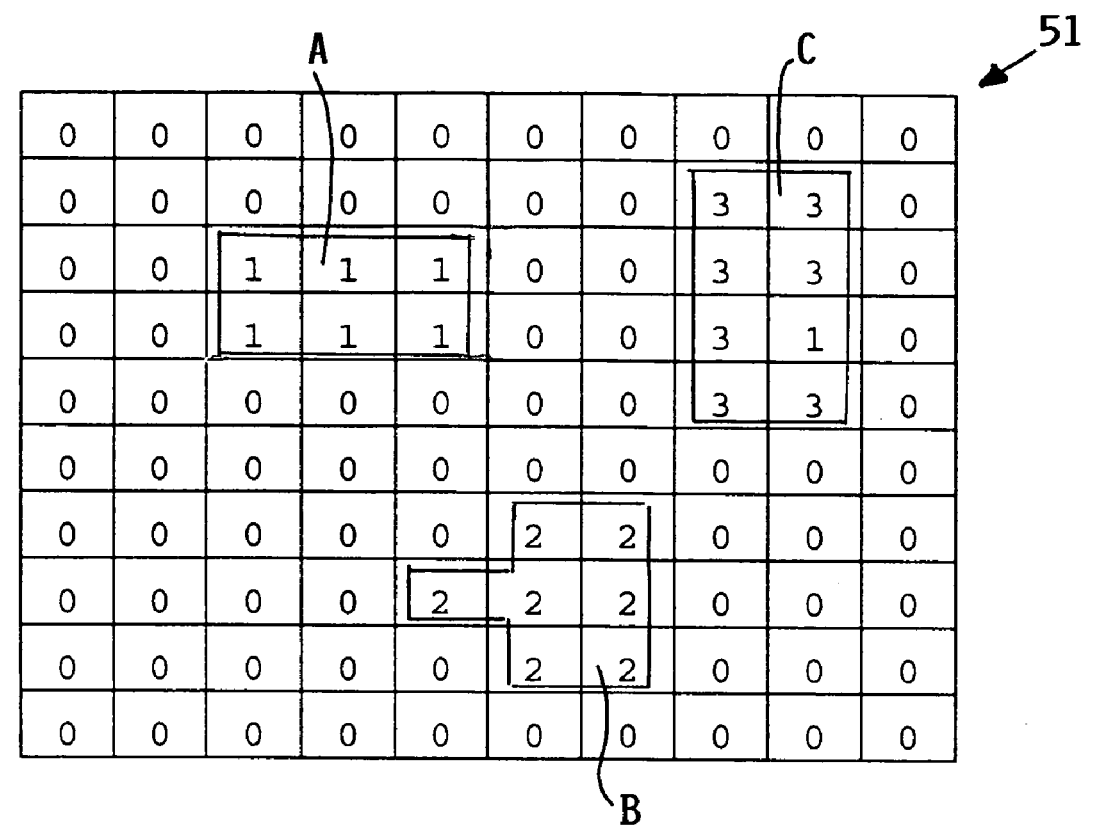

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 3 | 3 | 0 |
| 0 | 0 | 1 | 1 | 1 | 0 | 0 | 3 | 3 | 0 |
| 0 | 0 | 1 | 1 | 1 | 0 | 0 | 3 | 1 | 0 |
| 0 | 0 | 0 | 0 | 0 | 0 | 0 | 3 | 3 | 0 |
| 0 | 0 | 0 | 0 | 0 | 0 | 0 | 0 | 0 | 0 |
| 0 | 0 | 0 | 0 | 0 | 2 | 2 | 0 | 0 | 0 |
| 0 | 0 | 0 | 0 | 2 | 2 | 2 | 0 | 0 | 0 |
| 0 | 0 | 0 | 0 | 0 | 2 | 2 | 0 | 0 | 0 |
| 0 | 0 | 0 | 0 | 0 | 0 | 0 | 0 | 0 | 0 |

FIG. 3

METHOD FOR RECOGNIZING OBJECTS IN AN IMAGE PIXEL PLANE

PRIORITY CLAIM

This application is based on and claims the priority under 35 U.S.C. §119 of German Patent Application 199 55 919.8, filed on Nov. 20, 1999, the entire disclosure of which is incorporated herein by reference.

FIELD OF THE INVENTION

The invention relates to a method for recognizing in an input image objects belonging to at least one given object class. The images are provided as digital images. The recognition takes place in or on the image pixel plane. The present method is particularly suitable for the automatic evaluation of image data representing large quantities of image informations.

BACKGROUND INFORMATION

Large volumes of image data are available in many fields of use. Such large image data volumes must be analyzed in accordance with predetermined criteria. For example, in the area of military reconnaissance, it is frequently the case that large quantities of image data of scenes or terrains are acquired by sensors. These acquired image data must be scrutinized with regard to the presence of installations, vehicles, infrastructure features and so forth in the terrain. These image data are generally acquired in large numbers which must be processed and evaluated within given time limitations. The objects to be recognized may have any random dimensions and may have a structure that characterizes any particular object. The structure of the object may be rather complex or it may be simple. In all these cases it is desirable to perform an automatic image analysis as rapidly as possible.

Other fields of application of this type of image evaluation are, for example, to be found in the area of medical diagnosis, for example when it is necessary to examine a large number of X-ray images, for instance for recognizing anomalies such as tumors or the like. Another example where an automatic image analysis method is employed is in the area of police work. This area includes the search for missing persons, the monitoring of border crossings or the like. In all these areas a reliable automatic rapid image analysis method provides great advantages.

General, theoretical approaches for such analysis method for the recognition of objects in images are known from an article in "Technical Report ISIS TR-4" by T. Dodd, University of South Hampton, 1996. This article describes different possible approaches to the analysis of digital images for the purpose of recognizing objects in such images.

Individual steps for analyzing images are known from the following publications. Different methods for a rough classification of objects are described in an article "Classifier and Shift-Invariant Automatic Target Recognition Neural Networks", by D. P. Casasent, L. M. Neiberg published in "Neural Networks", Vol. 8, No. 7/8, by Elsevier Science Ltd., 1995. General methods for the dissecting or decomposing of a digital image into image components represented by signals are found, for example in a publication "Practice of Digital Image Processing and Pattern Recognition" by P. Haberaecker, published by Carl Hanser Verlag, 1995. The so-called "Ensemble Theory for Classifiers" has been described in an article "Machine Learning Research" by T. G. Dietterich that appeared in "Al Magazine", Vol. 18, No. 4, 1997, published by AAAI Press. A possible way of merging or fusing individual results of an analysis are described in "Vehicle Detection in Infrared Line Scan Imagery Using Belief Networks" by P. G. Dubksbury, D. M. Booth and C. J. Radford, published at the $5^{th}$ International Conference of Image Processing and Application, Edinburgh, 1995.

German Patent Publication DE 44 38 235 A1 discloses a method for recognizing objects in natural surroundings. The known method uses several classifiers which operate in accordance with a predetermined, simple rule. A disadvantage of the known method is seen in that it can function only, and on principle, under the assumptions that the objects to be recognized are compact and at least partially symmetric. Thus, the method is useful only for the recognition of point-shaped objects. The method cannot be used for recognizing larger and structurized objects.

German Patent Publication DE 196 39 884 C2 discloses a system for recognizing patterns in images. For classifying an object, the known system requires the input and processing of feature or characterizing parameters of the object in order to produce a recognition result based on such parameters. The system requires the use of a complex classifier. A disadvantage of the known system is seen in that only a clearly determined object can be recognized.

OBJECTS OF THE INVENTION

In view of the above it is the aim of the invention to achieve the following objects singly or in combination:

to provide an image analyzing method that operates sufficiently reliable for the intended purposes of simultaneously recognizing a multitude of complex objects of any random size in an image;

to provide an image recognition method or process which, by its very systematic features, is suitable for an automatic object recognition from a large number of images under time limitations;

to provide a recognition method that yields as the result of its analyzing procedure an output statement regarding the presence of a multitude and complex object in an image; and to provide a rapid and automatic evaluation of large quantities of image data by a concrete and robust analysis method for an object recognition.

SUMMARY OF THE INVENTION

According to the invention at least one object class or a plurality of different object classes and respective classifiers are used simultaneously. Thus, it is possible to evaluate an input image for a respective number of object classes. In a fusing or merging step of reduced images a decision is made for each object class and that decision provides directly the position and type of the recognized object or objects. In order to achieve such a rapid analyzation of a multitude of images the invention employs rules that are learned by a neural network on the basis of representative examples. A characterizing or feature vector is used for the formation of the classifiers. The feature vector is formed from a previously determined vicinity of a respective relevant pixel point of a corresponding filter image.

More specifically, the method according to the invention comprises the following steps:

(a) roughly classifying (10) pixel points of said received images whether or not a pixel point is relevant for said object recognition to provide relevant pixel points;

(b) forming (11) a reduced image based on relevant pixel points as roughly classified in step (a);

(c) filtering (20) each reduced image (11) for forming at least two corresponding decomposed or filtered images (21, 22, 23) whereby image components relevant for said object recognition are retained in said filtered images;

(d) further classifying (30) said filtered images for providing classified images, wherein said further classifying is performed by a group of different classifiers which operate in accordance with learned rules to allocate said classified images to different object classes, wherein each of said classifiers operates based on a characterizing vector forming an input information for its respective classifier;

(e) merging or fusing (40) said classified images in accordance with an algorithm to form a combined global evaluation or decision for each class of said object classes, said global evaluation or decision representing merged images (41A, 41B, 41C);

(f) deciding (50), on the basis of said merged images, whether a pixel point is relevant and if so to which of said object classes each relevant pixel point belongs.

The method according to the invention is robust and practical and can be used for the recognition of a large number of complex, different object classes, such as vehicles, persons, buildings and so forth. Furthermore, the present method is suitable for use in connection with a large number of different image sources such as video cameras, infrared cameras, X-ray cameras and so forth.

BRIEF DESCRIPTION OF THE DRAWINGS

In order that the invention may be clearly understood, it will now be described in connection with example embodiments, with reference to the accompanying drawings, wherein:

FIG. 3 shows symbolically a possible decision result image achieved by the last step of the present method showing pixel points that are not relevant by a zero and recognition relevant pixel clusters designated by a respective classification number.

DETAILED DESCRIPTION OF PREFERRED EXAMPLE EMBODIMENTS AND OF THE BEST MODE OF THE INVENTION

Figure 1:
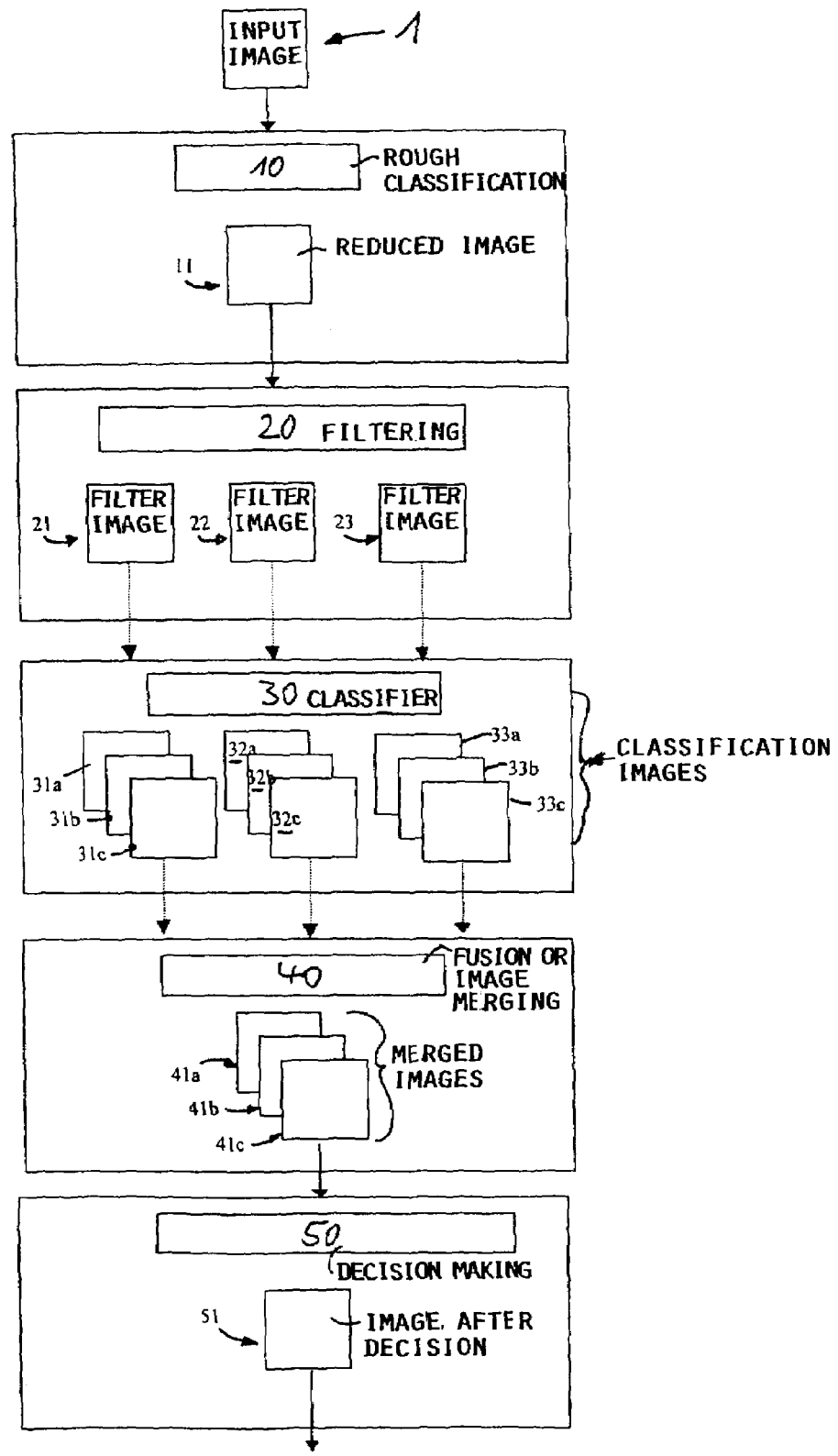
FIG. 1 shows a flow diagram of the object recognition method according to the invention for three object classes whereby the method is performed on the image pixel plane of the images to be analyzed.
Figure 2:
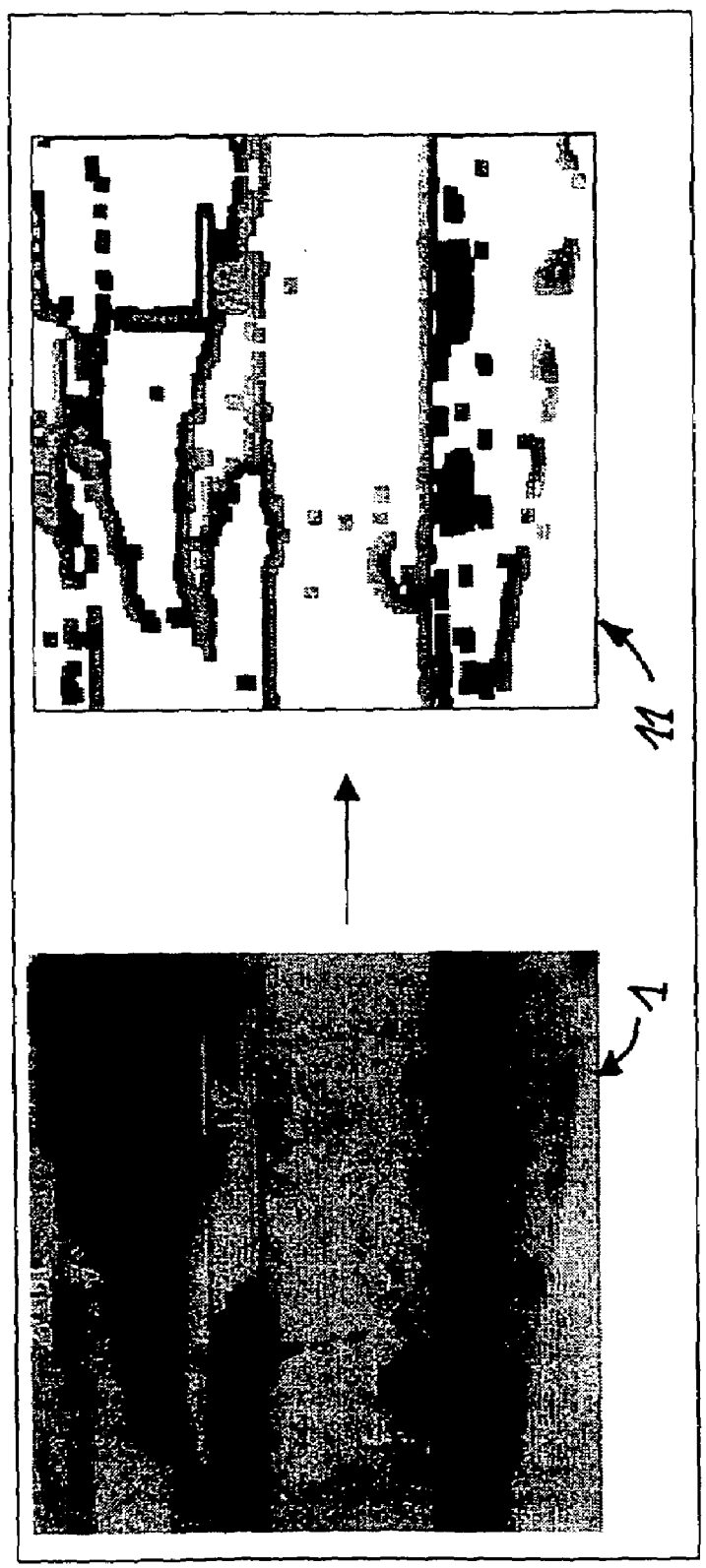
FIG. 2 shows in its left side an example of a received or input image that has been reduced in a first step of the present method to form a reduced image shown on the right side.

Referring to FIG. 1, the method according to the invention is performed for recognizing objects in images. Three object classes are processed in the flow diagram of FIG. 1. First, an input or individual image 1 shown on the left-hand side of FIG. 2 is separately analyzed in a first rough classification step 10. In this rough classification step 10 the input image 1 is viewed as a unit. Stated differently, the input image 1 is not yet analyzed or dissected. However, in step 10 the input image 1 is separated into pixel points that are relevant for an object recognition and pixel points that are irrelevant for the object recognition and thus can be ignored.

The right side of FIG. 2 shows the rough classification. Dark areas show relevant pixels, light areas show irrelevant pixels. A suitably selected rough classifier determines the relevance or irrelevance of each pixel of the input image 1 for the following method steps. The individual image points of the input image 1 are roughly classified in accordance with a given first criterion that determines the weightiness or significance of the individual pixel point for the object classification and recognition. This given first criterion takes into account, for example whether the image has interesting areas, which may be recognizable objects or at least portions thereof.

Another example of such a first criterion is the relative homogeneity of the vicinity of a pixel point that is being viewed. The assumption is made that homogeneous image areas do not contain any recognizable objects. The vicinity of a pixel point is defined by a given raster pattern in the image. Such vicinity is made up of a number of pixels. In order to ascertain the homogeneity of a pixel point vicinity that is being viewed, pixel points that have similar characteristics are considered. For example, the pixels of an area or vicinity may have similar color values. If these characteristics of the area correspond to the given homogeneity criteria, then the respective pixel point is classified as not relevant for the performance of the following method steps and is thus not processed. If the given criterion, such as homogeneity is not satisfied, in other words, if a nonhomogeneous vicinity is recognized around a particular pixel point, the respective pixel point is classified as being relevant for the further processing.

FIG. 2 shows an example of an input image 1 that was taken by an infrared camera in a low flying aircraft. The input image 1 shows a scene including a terrain with vehicles. These vehicles are automatically recognizable by means of the method according to the invention. In the first step each pixel point of the image is checked whether the particular pixel point has a vicinity with similar color values. Thus, for example homogeneous image regions or areas are recognized if they are made up of pixel points having rather similar color values. On the other hand, the vehicles show locally distinctly different color values and the respective pixel points do not satisfy the predetermined homogeneity criteria. Thus, all pixel points which, for example belong to fields are classified in the rough classification step 10 as being irrelevant for the further processing while all pixel points that relate, for example to the vehicles are classified for further processing in the following method steps.

Referring further to FIG. 2, the right-hand side of FIG. 2 shows the reduced image 11 resulting from the rough classification. The left-hand side of FIG. 2 showing the input image 1 is the result of an image acquisition by an infrared sensor or camera showing a terrain with a road and dark spots on the road in the lower one half of the left side of FIG. 2. These dark spots represent vehicles. As a result of the rough classification the irrelevant image points have been identified and the right-hand part of FIG. 2 shows these irrelevant pixel points as white areas. These white areas are ignored in the following method steps 20, 30, 40 and 50 in which steps exclusively only the image areas are further processed which are shown as dark pixel points.

The rough classification step 10 shown in FIG. 1 reduces the areas of the input image 1 that need to be processed to form a reduced image 11. The following method steps are concentrated exclusively to the processing of image pixel points remaining in the reduced image 11 following the rough classification step 10. Thus, in the following method steps 20, 30, 40 and 50 the relevant pixel points are exclusively processed and pixel points that were classified as not relevant in step 10 are completely ignored.

The next step 20 involves a dissecting or filtering of the reduced image 11 to form signal presentations by way of preferably multiple filtering substeps in accordance with known section criteria to form several filter images 21, 22 and 23, each of which contains the scene that remained in the reduced image 11 as far as that scene is relevant for the object recognition. In other words, the filter images 21, 22 and 23 correspond to each other as far as the shown image content is concerned. Generally, the reduced image 11 is divided at least into two corresponding filter images. However, in accordance with the embodiment of FIG. 1, three corresponding filter images 21, 22 and 23 are formed in the filtering step 20. This filtering is preferably performed in a two-dimensional fashion. However, the filtering can also be performed in a one-dimensional fashion, whereby the filtering takes place along the rows or columns of the reduced image 11. The filter images 21, 22, 23 correspond preferably to complementary informations taken from the reduced images 11. These complementary informations contained in the filter images 21, 22, 23 taken together, permit forming or obtaining the complete information gathered from the reduced image 11. In other words, all image components that remained in the image 11 after reduction are subjected to the filtering step 20.

For example, a reduced image 11 could be divided in the filtering step 20 into a first corresponding filter image 21 containing small image elements, a second corresponding filter image 22 with somewhat large image elements, and a third corresponding filter image 23 with remaining still larger image elements. For example, the small image elements could be compact cars, the second elements could be vans, and the third elements could be large trucks. The scene represented in the reduced image 11 is not affected by such filtering. It is retained, which means that the relevant image components and their correlation relative to one another is retained. Irrelevant image components such as the nature of the terrain are no longer present in the filter images, but the rough scene of the reduced image 11 is fully retained in the filter images 21, 22 and 23. Viewing, for example, the above mentioned image of a road with vehicles on the road and fields next to the road, the filter image 21, for example, could show the object details of the vehicles, such as the tires and the headlights. The filter image 22 could emphasize the central vehicle structural component such as the windshield, the hood, and so forth. The filter image 23 could then emphasize the rough contours of the vehicle. However, in spite of such emphasis of detail each of the filter images 21, 22, 23 keeps containing the entire scene of the road and the vehicles.

According to another example embodiment of the invention the filtering step 20 may divide the reduced image 11 in accordance with color areas or in accordance with gray values. Another criterion for the division or filtering of the reduced image 11 could be to form an image pyramid that contains the individual corresponding filter images or representations. Each step of the image pyramid corresponds to another generally lower resolution of the input image 1. Thus, the informations contained in the reduced image 11 are divided in accordance with different resolutions. More specifically, the object or objects contained in the reduced image 11 may be shown in the filter images with different resolutions, whereby each corresponding filter image shows the respective image information or image object in a different size dimension. For example, passenger cars may be enlarged while trucks are relatively reduced in size.

The next step 30 according to the invention tests each pixel point of each of the filter images 21, 22, 23 with reference to a respective classifier. At least one classifier is provided for each filter image. The total number of classifiers used forms an ensemble or group of classifiers. Such ensemble or group comprises at least two classifiers. According to the invention each classifier operates independently of any other classifier and the classifiers are generally differentiated from one another.

The result of the step 30 or the result of the testing of the pixel points by the ensemble of classifiers provides for each filter image 21, 22, 23 a respective group of classification images 31A, 31B, 31C and 32A, 32B, 32C and 33A, 33B, 33C as shown in FIG. 1. In the illustration of FIG. 1 the classification images 31A, 32A and 33A represent the result of the testing with an ensemble of classifiers for a certain object class C1, for example representing a defined vehicle type. The classification images 31B, 32B and 33B represent an object class C2 while the classification images 31C, 32C and 33C show a third object class C3, for example a further different vehicle type. However, the present method is not limited to these three example object classes.

According to the invention different weighting factors or significance factors are allocated to each pixel point of each of the individual classification images. These weighting factors represent a measure or evaluation of the respective classifier that determines to which object class the pixel point belongs which pixel point is being considered. These weighting factors or evaluation numbers may, for example represent probabilities or a predetermined rank order or hierarchy.

Each classifier operates as follows. Each classifiers ranks the input values, that is each pixel point of the respective pixel images 21, 22, 23 with regard to the pixel point vicinity. More specifically, each classifier allocates to each pixel point of the respective filter image in accordance with a predetermined rule, output values in the form of evaluation numbers or criteria. The output values of the classifier indicate approximately how certain the classifier is with regard to the question: To which class does this pixel point under consideration belong? The following examples of classifiers may be used in accordance to the invention, such as polynomial classifiers, support vector machines, neural networks or the like.

If, for example, neural networks are used as classifiers, FIG. 1 requires an ensemble of three different neural networks. Each of the filter images 21, 22, 23 is allocated to one of these three neural networks. Thus, each neural network processes one of the filter images. Each neural network allocates to each pixel point of the respective filter image 21, 22, 23 an evaluation measurer or number in accordance with given or predetermined rules for each object class. The evaluation number or measure may, for example be a probability value in the respective classified image 31A, 31B, 31C or 32A, 32B, 32C or 33A, 33B, 33C. Stated differently, the neural network stores the allocated evaluation number or measure and then visualizes that value, for example by a color coding in the classification or classified images 31A, 31B, 31C or 32A, 32B, 32C or 33A, 33B, 33C.

The rule by which a classifier works is preferably obtained from available and analyzed examples of representative input values which have been analyzed prior to the application of the method according to the invention as shown in FIG. 1. This formation of the classifier in accordance with the just mentioned rule generally involves an iterative adaptation of the classifier to the given examples which contain the applicable rule or which define the applicable rule. If neural networks are used this iterative adaption phase is referred to in the respective literature as "training phase" or as "learning of a rule". If other classifiers are employed according to the invention they may, for example, involve a statistical method.

If, for example it is required that different vehicle types must be classified from available input images 1, the classification step 30 may be based on predetermined classes such as "compact cars", "limousines", and "vans or pick ups". Different features of vehicles are extracted from the reduced images 11 by the filtering step 20. A feature vector or characterizing vector is formed from these features for each pixel point. The components of such a characterizing vector are supplied to the classifiers as input values. The classifier such as a neural network uses these input values as a basis for the classification of each pixel point. More specifically, the classifier allocates, in accordance with a previously determined rule, the above mentioned evaluation number, which may also be referred to as weighting factor or significance number, to each feature vector for each of the classes "compact cars", "limousines", "vans" or "pick ups".

As mentioned, the characterizing or feature vectors required for the training of the neural network classifiers prior to applying the method according to the invention can, for example, be obtained on the basis of available representative example input images. In the forming of these feature or characterizing vectors that are required for the training of the neural network for learning the rules, only those pixel points are used from the filter images 21, 22, 23 which passed the rough classification step 10 of example input images and were recognized or classified as relevant pixel points. The example input images are to be distinguished from the input images 1 that are processed according to the present method.

The input values to each classifier are assembled on the basis of the vicinity of the image or pixel point under consideration in the respective filter image 21, 22 or 23. More specifically, for each pixel point a vicinity around the pixel point is selected. The vicinity includes left, right, upper and lower neighboring pixel points of the pixel point that is being evaluated. The selection of the vicinity including the number of pixel points forming the vicinity can be made dependent on the objects to be recognized or the selection may be fixed. The selection criteria are based on the characteristics or features of the objects to be recognized. For example, large objects require the examination of large vicinities because the recognition of large objects requires generally more features than are necessary for the recognition of smaller objects. The pixel points making up the vicinity are sorted into a feature or characterizing vector in accordance with given rules. Based on this characterizing or feature vector, the respective classifier of the ensemble provides output values for each pixel point and these output values are interpreted with regard to the evaluation number or weighting factor that allocates a relevant pixel point to a specific class.

An example of a rule for the formation of a feature vector from the vicinity of a pixel point will now be described. When forming the characterizing or feature vector, the values representing the vicinity of the pixel point in the respective filter images 21, 22 and 23 are sorted in spiral fashion into a coefficient vector. A rapid Fourier transformation is then applied to the coefficient vector. Thereafter, the feature vector is formed from the absolute values of the Fourier transformation coefficients.

A classification step 30 is performed following the filtering step 20. Step 20 provides signal representations in the form of filter images 21, 22 and 23 which contain features of small, medium sized and large objects, then step 30 is performed in the following sequence. A feature vector is formed for each pixel point of the respective filter image 21, 22, 23. This feature vector is formed from the pixel points forming the vicinity of the pixel point under consideration. For example, a vicinity may be formed by 5×5 pixel points. The pixel point under consideration, which is to be evaluated is in the center of this cluster of pixel points forming the vicinity. This feature vector comprises 25 components in accordance with the selected 5×5 vicinity. The components of the feature vector are assembled from encoded values of the respective filter image 21, 22 or 23. A further possible rule for the production of a feature vector based on the 5×5 pixel vicinity provides, for example, that the columns of the 5×5 pixel vicinity are sequentially sorted into the feature vector. Based on the formed feature vector, the classifier that is allocated to the respective filter image provides output values which constitute an evaluation of the pixel point under consideration and the evaluation determines to which object class the respective pixel point belongs, for example compact cars, limousines, or pick ups or vans. The feature vectors, for example from the filter image 21 comprise, for example vehicle details which are specific to a particular vehicle class, whereby it becomes possible for the classifier to allocate the respective pixel point to the relevant class. Similarly, or analogously, the feature vectors of the filter image 22 have reference to vehicle structures of midsized vehicles and the feature vectors of the filter image 23 have relevance to large vehicle structures. In all instances these vectors form the basis for the decision made by the respective classifiers. The classifier provides for each object class an output value. Such an output value provides, for example information regarding the probability with which a pixel point under consideration can be allocated to a specific object class. This output value is stored in the respective classification image 31A, 32A, 33A, or 31B, 32B, 33B or 31C, 32C, 33C. The output value may be visualized by a color coding of a respective value range. For example, if the output value is made black, the probability is zero percent, a white color for the output value represents, for example a probability of 100%. Assuming that the evaluation numbers are to be expressed in probabilities, it would be possible, for example, that the first classifier which is allocated to the filter image 21 provides, based on the respective feature vector of a certain pixel point the following probability allocations: 13% for the object class compact cars, 17% for the object class limousine, and 70% for the object class pick up or van. These three probabilities are stored in the classification images 31A, 31B, 31C and visualized. The classification images 32A, 32B, 33C and 33A, 33B, 33C are formed analogously as just described.

The next step 40 in the method according to the invention performs a fusion or merging of the above classification images 31A to 33C for each object class. This merging step combines the obtained individual evaluation numbers of the classifiers for each image or pixel point and for each classification image 31A to 33C to form a global evaluation or decision which is presented in the form of the merged images 41A, 41B and 41C as shown in FIG. 1. In this way one obtains for each image point of the reduced image 11 and for each object class a global evaluation or decision number which represents the combined evaluation of the classifiers forming a group or classifier ensemble.

The individual evaluation numbers of the classifiers of an ensemble are combined in accordance with predetermined known mathematical methods. For example a mean value may be calculated on the basis of the individual evaluation numbers and this mean value may be used as the global evaluation result. If one considers the decision of a classifier as a probability statement, statistical methods may be used in order to obtain the final or global decision. Such statistical methods are, for example the Bayes-Fusion or the Dempster-Shafer-Fusion. For this purpose the output values of the classifiers are approximated in accordance with probabilities and are then merged with the aid of the probability theory and on the basis of known apriori probabilities. The apriori probabilities may, for example, be obtained from context information regarding the type, position and content of the input image 1 to be evaluated. The probability values of the classifiers or the ensemble of classifiers are gathered pixel by pixel for each object class in the merging or fusing step 40. The merging or fusing result of each object class thereby corresponds to a final probability statement for the pixel point under consideration or to be evaluated and with reference to the predetermined object class.

The merging or fusion step 40 for the individual evaluation numbers of the ensemble for any random pixel point of the reduced image 11 may, for example take place in the following sequence. The evaluation numbers of the different classifiers of the corresponding pixel points of the classification images 31A to 33C are combined with an algorithm for each object class. Assuming, for example that the evaluation numbers are probabilities then the classifiers of the ensemble provide for a certain object class and pixel by pixel a respective probability percentage, for example the following probabilities: 87%, 83% and 95%. The merging or fusing result for this pixel point and for this object class could now be determined, for example as the mean value of the three probabilities, thereby obtaining 88.3%. The individual numbers of probabilities in this example have the following significance or meaning: a first classifier of the ensemble which is allocated to the filter image 21 provides for a defined object class and for the pixel point of the reduced image 11 under consideration the probability value of 87%. More specifically, the classifier allocates to the pixel point under consideration and on the basis of the features of the filter image 21 the probability of 87% that this pixel point belongs to a defined object class, for example object class A represented by the cluster A in FIG. 3. The probability values of the remaining classifiers and pixel points are to be interpreted correspondingly. The fusion or merged overall or global probability per pixel point means that the ensemble of image classifiers has allocated to the pixel point under consideration a probability of, for example 88.3% that it belongs to a determined object class such as object class A. The merging or fusing for the other object classes takes place in an analogous manner.

The last step 50 according to the invention establishes a decision result image 51. In this step it is determined on the basis of the merging or fusion images 41A, 41B, 41C for each pixel point of the reduced image 11 whether that point belongs to an object class and, if so, to which of these object classes the pixel point belongs. For this allocation in step 50 the total evaluation numbers of the corresponding pixel points of the fusion images 41A, 41B, 41C are combined with each other, for example by forming the maximum of the total evaluation numbers for the different object classes. Then that object class is selected which has the highest value in the global evaluation number. The thus determined maximum global evaluation number for one object class is then compared with a given threshold value. If the global evaluation member or value exceeds the threshold value a corresponding class, suitably encoded, is allocated to the respective pixel point in the decision result image 51. The previously selected threshold value determines for each pixel point whether or not that pixel point is part of an object of a determined object class.

A possible formation of the decision result image 51 will now be described. Assuming that three recognizable object classes are used, for example compact cars, limousines, pick ups or vans. Under this assumption a certain pixel point, for example of the object class "vans" has assigned thereto the highest value of the respective global evaluation number. If this highest value is larger than a given threshold value, then the pixel point under consideration is allocated to the object class "vans". If the global evaluation number is below the threshold value, it is assumed that the respective pixel point does not belong to any of the object classes. Zero (0) have been allocated to the pixel points that have been eliminated in the rough classification 10, as shown in FIG. 3. Identification numbers 1, 2, 3 have been allocated to the pixel points that fall into the three example object classes. These pixel points are part of the decision result image 51. For example, "1" refers to the object class of compact cars, while "2" refers to the class of limousines and "3" refers to vans and pick ups as described above and shown in FIG. 3. The letters A, B, C designate respective pixel clusters. Referring further to FIG. 3, the decision result image 51 illustrates recognized objects in the three object classes represented by respective three pixel clusters A, B and C. A pixel cluster is generally formed by a larger number of neighboring pixels with identical characteristics, for example identical color values. In the decision result image 51 the pixel coding numbers 0, 1, 2 and 3 are given merely as an example. An object class is characterized in that the neighboring pixel points are predominantly allocated to a certain object class so that these pixel points predominantly have the same encoding. For example, clusters A and B in FIG. 3 are uniformly formed by code numbers 1 and 2, respectively. However, cluster C has within a plurality of pixels that are encoded with number 3, one pixel point encoded with number 1. These clusters correspond to defined vehicle types as described. The size of the respective cluster corresponds approximately to the dimensions of the vehicle or vehicles in the initial input image 1. The fact that the cluster C in FIG. 3 includes one pixel that does not belong into the respective object class does not make the cluster C ambiguous.

The decision result image 51 may be used for further processing in the object plane. However, the method according to the invention relates only to the image pixel plane. In the following an example is provided how the transition from the iconic or image pixel plane to the symbolic object plane can be performed. In the symbolic object plane the image content is described by symbols. The method steps for such transition from the iconic image pixel plane to the symbolic object plane are well known in the art. Based on, for example the cluster size that is the number of pixels having the same encoding in a common cluster, it is possible to decide in the decision image 51 whether or not any particular cluster represents a real object falling into a predetermined object class in the input image 1, on the symbolic object plane. If, for example, the pixel points form a cluster in the decision result image 51, the size of which exceeds a certain value, for example more than 100 pixels, the cluster is considered to be equal to a recognized object of the respective object class. The positions of the recognized objects in the input image 1 may, for example be approximated from the positions of cluster concentration in the decision result image 51.

The reduced image 11, the filter images 21, 22, 23, the classification images 31A, 32A, 33A or 31B, 32B, 33B or 31C, 32C, 33C, the fusion or merging images 41A, 41B, and 41C, as well as the decision result image 51 need not be imaged in a visual sense. Rather, these images may be formulated by means of mathematical methods, for example by means of matrices.

Figure 4:
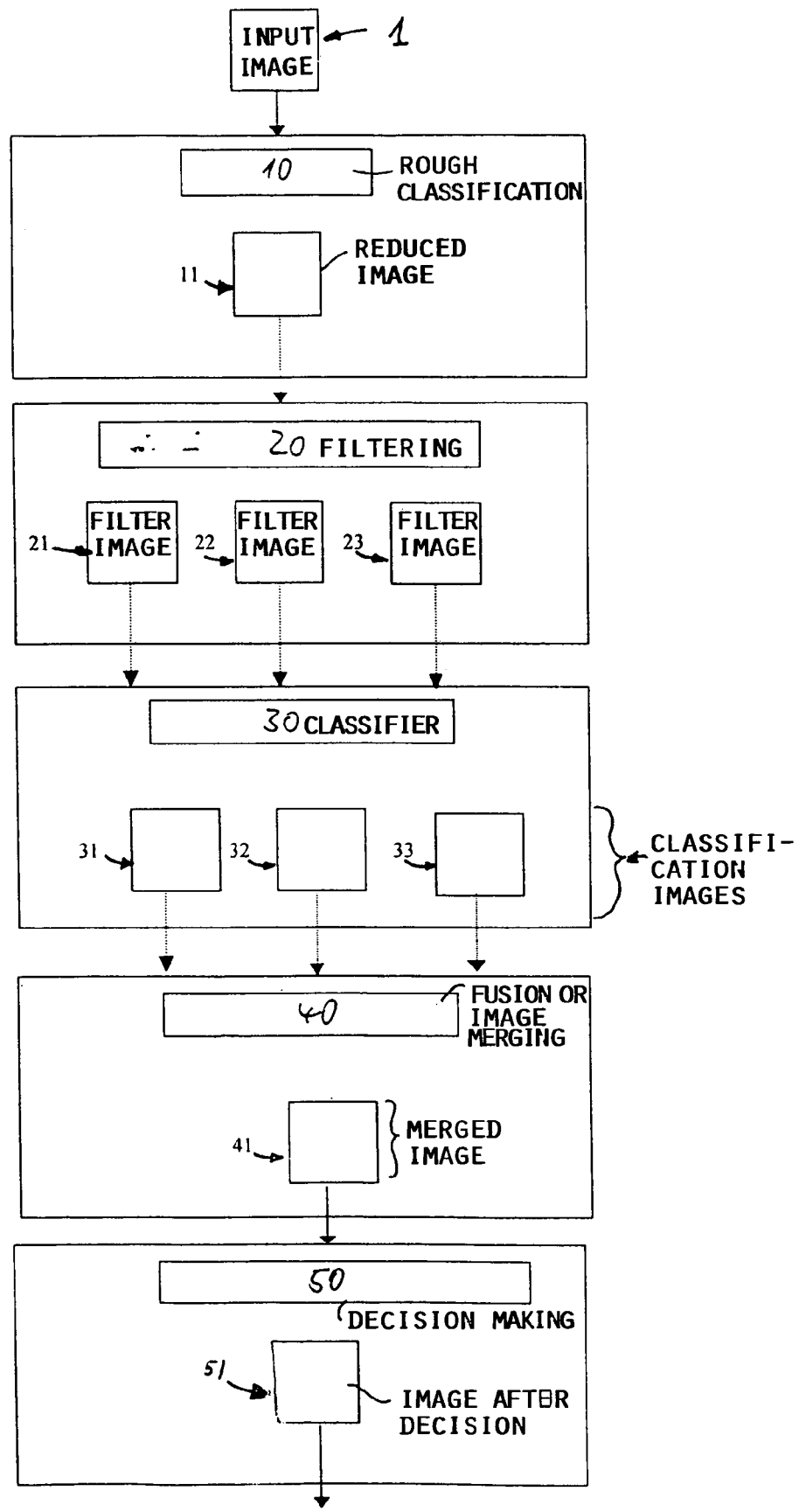
FIG. 4 is a flow diagram similar to that of FIG. 1, however illustrating the present method as applied to a single object class.

FIG. 4 shows the method according to the invention as performed with reference to only one relevant object class for which a search is made. FIG. 4 illustrates the simplest application of the present invention. However, the present method may be used for recognizing objects in a plurality of object classes.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for multiple object recognition on an image pixel plane of received images, said method comprising:

(a) roughly classifying all pixel points of said received images according to whether or not a pixel point is relevant for said multiple object recognition, according to a set of first criterion related to a nonhomogeneous vicinity around each particular pixel point, to eliminate irrelevant pixel points from the relevant pixel points;

(b) forming a reduced image based on said relevant pixel points as roughly classified in step (a);

(c) filtering each reduced image for forming at least two filtered images whereby image components relevant for said multiple object recognition are retained in said at least two filtered images;

(d) further classifying each pixel point of said at least two filtered images for providing classified images, wherein said further classifying is performed by a group of different classifiers which operate in accordance with learned rules to allocate, with evaluation number, said classified images to different object classes, wherein each classifier of said group of different classifiers operates based on a characterizing vector of a respective filtered image forming a direct input information for its respective classifier and wherein each different classifier works independently of any other classifier of said group of different classifiers;

(e) merging, for each pixel point, said classified images in accordance with an algorithm based on the evaluation numbers to perform a combined global evaluation for each class of said different object classes for providing merged images; and (f) deciding for each pixel point, on the basis of said merged images, whether a pixel point of all remaining pixel points is still relevant and if so to which of said different object classes each relevant pixel point belongs.

2. The method of claim 1, further comprising providing a set of second criteria for performing said filtering step (c).

3. The method of claim 1, further comprising acquiring vicinity image data representing a vicinity of a respective relevant pixel point of a corresponding filtered image, and forming said characterizing vector from said vicinity image date.

4. The method of claim 1, wherein the allocation with evaluation number of said classified images to different object classes comprises allocating certain evaluation numbers of a different weighting factors to each relevant pixel point thereby marking each relevant pixel point with regard to which of said different classes of objects the marked pixel point belongs.

5. The method of claim 3, wherein said step of acquiring said vicinity image date comprises sorting said vicinity image data in a spiral pattern into a vector of coefficients, applying a rapid Fourier transformation to said vector of coefficients to form transformation coefficients and forming said characterizing vectors of an absolute value of said transformation coefficients.

6. The method of claim 1, further comprising using, as said group of different classifiers, a neural network capable of learning for performing said step of further classifying.

7. The method of claim 6, further comprising selecting from relevant pixel points of said filtered images characterizing or feature vectors representing features of said relevant pixel points of said rough classifying, and forming rules for said neural network from said characterizing or feature vectors.

8. The method of claim 1, further comprising performing said merging step in accordance with a statistical process for obtaining said global evaluation, and further comprising using in said statistical process information based at least on one of a type, position and content of said received images to be evaluated.

9. The method of claim 1, further comprising representing recognized objects by pixel clusters in an image that represents a decision regarding said combined global evaluation while performing said deciding step.

* * * * *